May 16, 1950     T. W. STEPHENSON     2,508,124
FUEL TANK FILLER PIPE CONSTRUCTION
Filed Sept. 26, 1946
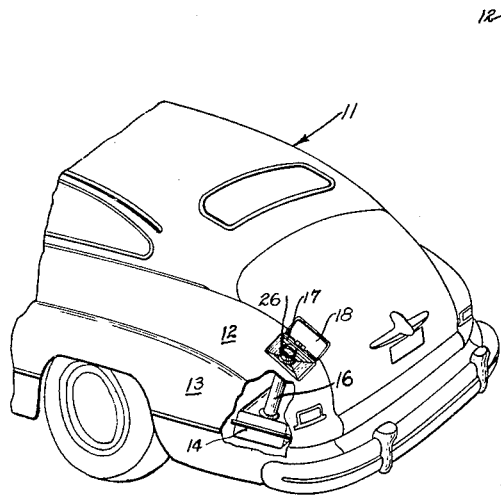
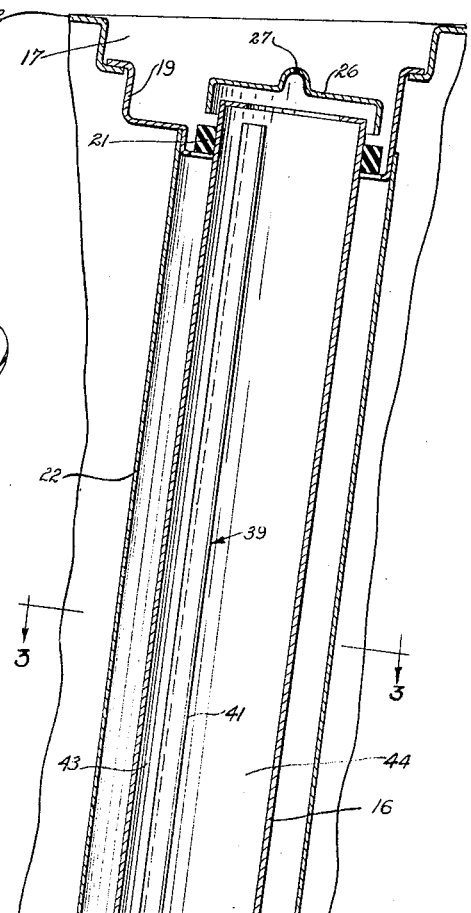
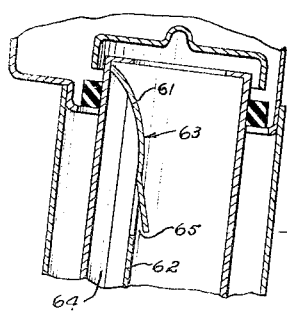
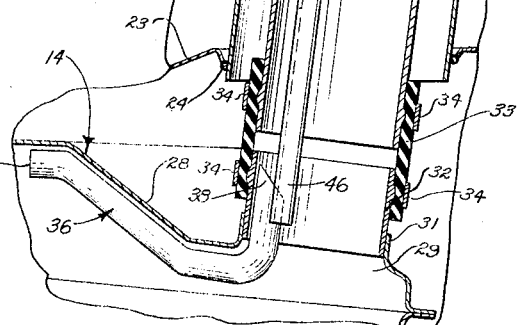
T. W. STEPHENSON
INVENTOR.
BY
ATTORNEYS.

Patented May 16, 1950

2,508,124

UNITED STATES PATENT OFFICE 2,508,124

FUEL TANK FILLER PIPE CONSTRUCTION

Thomas W. Stephenson, Detroit, Mich., assignor to Ford Motor Company, Dearborn, Mich., a corporation of Delaware Application September 26, 1946, Serial No. 699,567

1 Claim. (Cl. 220—86)

This invention relates generally to a fuel tank filler pipe or tube construction for a motor vehicle and has particular reference to such a construction wherein means are provided for facilitating the escape of air from the fuel tank during the filling thereof.

Motor vehicles commonly have a fuel tank mounted upon the chassis and a filler pipe mounted within the body and extending through the fender. During assembly of the body to the chassis a flexible hose is used to couple the filler pipe to the spout of the fuel tank. With such a construction, however, unless means are provided for conducting air from the tank, it is possible to admit sufficient fuel into the filler pipe to fill the latter and prevent the escape of air, thus causing an air pocket to be formed in the tank and the filler tube to overflow. It has heretofore been suggested to provide a breather tube within the fuel tank which is connected during assembly of the body to the chassis to a breather tube within the filler pipe. The connection between the two breather tubes is difficult to make, however, and is rendered particularly difficult since the top of the breather tube within the fuel tank is generally located beneath the top of the fuel tank spout to enable a temporary cap to be placed over the spout during shipping and prior to final assembly with the filler pipe.

The present invention has for a primary object the elimination of the difficulties mentioned above and the provision of extremely inexpensive means for conducting air from the fuel tank through the filler pipe. A further object is to provide a construction in which an adequate conduit is provided for the escape of air from the fuel tank, but in which the need for aligning and connecting together conduits in the tank and the filler pipe is completely eliminated, thus simplifying assembly.

Other objects and advantages of the invention will be more apparent as this description proceeds, particularly when considered in connection with the accompanying drawings, in which:

Figure 1 is a perspective view, partly broken away, of the rear portion of a motor vehicle embodying the present invention.

Figure 2 is a greatly enlarged transverse cross sectional view through the filler pipe and a portion of the fuel tank shown in Figure 1.

Figure 3 is a horizontal cross sectional view taken substantially on the plane indicated by the line 3—3 of Figure 2.

Figure 4 is a fragmentary cross sectional view of a modification.

Referring now more particularly to the drawings, there is shown in Figure 1 a motor vehicle having a body 11 including a rear quarter panel 12 and a rear fender 13 on the left side of the body. The quarter panel and fender are shown broken away in Figure 1 to reveal the fuel tank 14 which is mounted upon the vehicle chassis in the usual manner. A filler pipe 16 is mounted within the body 11 and extends into a well 17 which is formed in the rear quarter panel 12 and closed by a filler door 18.

As best seen in Figure 2, the well 17 in the quarter panel 12 is apertured and supports a recessed stamping 19 within which the upper end of the filler pipe 16 is mounted by means of a rubber pad 21. Surrounding the filler pipe 16 and concentric therewith is a cylindrical shield 22, the upper end of which is welded to the stamping 19 and the lower end of which extends through an opening in the trunk floor 23, being insulated therefrom by means of a rubber grommet 24. The purpose of the shield 22 is to permit fuel which may be spilled into the well 17 or which overflows the filler pipe to be conducted downwardly and wasted to the pavement without entering the trunk compartment. A conventional cap 26 provided with an air vent 27 closes the upper end of the filler pipe.

The upper wall 28 of the generally rectangular fuel tank 14 is depressed adjacent one end and is provided with an opening 29 for the admission of fuel into the tank. A flange 31 is formed in the tank adjacent the opening and receives a spout 32 which is suitably secured thereto, as for example by welding. During assembly of the vehicle body to the chassis, the lower end of the filler pipe 16 and the upper end of the spout 32 are joined by a rubber filler hose 33 which is clamped to the pipe and spout by means of hose clamps 34.

A breather tube 36 is mounted within the fuel tank 14 adjacent the upper wall 28 thereof and has an inner end 37 opening into the upper portion of the tank and an outer end 38 extending into the spout 32 adjacent the inboard side thereof. It will be noted that the outer end 38 of the breather tube terminates below the top of the spout 32 so that a temporary cap can be placed over the spout to close the tank during shipping and prior to assembly with the filler pipe.

Referring now to Figure 3 as well as Figure 2, reference character 39 indicates a sheet metal baffle mounted within the filler pipe 16 and extending from adjacent the top of the latter to a point below the bottom of the pipe. The baffle 39 has a body portion 41 which is arcuate in cross section and a pair of return bend flanges 42 extending from opposite sides of the body portion. The flanges 42 are also arcuate in cross section, and correspond in curvature to the curvature of the interior surface of the filler pipe 16.

This enables the flanges 42 to fit closely adjacent the inner surface of the filler pipe and to be spot welded thereto. It will be noted that the baffle is located entirely upon one side of the pipe and divides the latter into a conduit 43 for the escape of air and a larger conduit 44 for the admission of fuel. The lower end 46 of the baffle extends substantially beyond the lower end of the filler pipe 16 and when the vehicle body is assembled to the chassis assumes a position in overlapping relation with the upper end 38 of the breather tube 36. The arrangement is such that the upper end 38 of the breather tube is located in vertical alignment with the widest portion of the air conduit 43 so that clearance is provided between the breather tube and the body portion 41 of the baffle. This clearance enables the assembly to be readily effected in spite of manufacturing variations.

It will be apparent that with this construction fuel may be admitted into the larger conduit 44 formed within the filler pipe on one side of the baffle and conducted downwardly into the spout 32 and thence into the fuel tank 14, while at the same time air may escape from the top of the fuel tank through the breather tube 36 and into the smaller conduit 43 formed within the filler pipe on the opposite side of the baffle. The admission of fuel in any quantity or velocity into the fuel tank through the conduit 44 can in no way interfere with the escape of air through the conduit 43, and overflowing of the filler pipe is thus effectively prevented.

Inasmuch as the baffle 39 comprises a simple sheet metal stamping which can be formed in one operation and which can be readily assembled within the filler pipe with a minimum number of spot welds adjacent each end of the pipe, the cost of the assembly is held at a minimum. In addition, there is no time lost during assembly of the filler pipe to the fuel tank since the lower end of the baffle automatically overlaps the upper end of the breather tube and the need for making a connection at this point is entirely eliminated.

Figure 4 illustrates a modification in which the upper end 61 of the body portion 62 of the baffle 63 is crimped over to close the upper end of the conduit 64, preventing any possible backup of fuel in the conduit 64 and overflowing thereof. The escape of air from the conduit 64 is provided for by pressing out a portion of the body portion 62 of the baffle to form a protected opening 65. Inasmuch as the opening 65 is near the top of the filler pipe, and above the bottom of a fuel nozzle which would be inserted into the pipe, it is open to atmosphere at all times.

It will be understood that the invention is not to be limited to the exact construction shown and described, but that various changes and modifications may be made without departing from the spirit and scope of the invention, as defined in the appended claim.

What is claimed is:

In a motor vehicle having a chassis and a body, a fuel tank mounted upon said chassis and having an opening therein for the admission of fuel, said fuel tank having an upwardly extending filler neck at said opening, a cylindrical breather tube mounted within said fuel tank and having one end extending upwardly inside said filler neck closely adjacent one side thereof and terminating a short distance below the top of said filler neck, a filler tube mounted within said body with its lower end in alignment with and spaced from the filler neck of said fuel tank, a rubber sleeve detachably connecting said filler tube to said filler neck, and a sheet metal baffle within said filler tube and extending axially of said tube, said baffle having a central body portion with return bent flanges at each side thereof, said flanges being arcuate in cross-section and conforming to the shape of the interior surface of said filler tube and secured thereto with the body portion of the baffle extending across the filler tube at one side of the center thereof to divide the tube into a larger fuel conduit for the entrance of fuel into said tank and a smaller breather conduit for the escape of air from said tank, the lower end of said baffle extending below the lower end of said filler tube and into said filler neck and axially overlapping the upper end of the breather tube therein, the body portion of the lower end of said baffle being spaced radially inwardly of said filler neck from the breather tube located therein to obviate the necessity of a fitted joint between the baffle and the breather tube yet providing a continuation of the breather tube to conduct air between the fuel tank and the upper end of the filler tube.

THOMAS W. STEPHENSON.

REFERENCES CITED

The following references are of record in the file of this patent:

UNITED STATES PATENTS

| Number | Name | Date |
| --- | --- | --- |
| 505,715 | Milsted | Sept. 26, 1893 |
| 2,246,861 | Slack | June 24, 1941 |
| 2,417,324 | Rivard et al. | Mar. 11, 1947 |

FOREIGN PATENTS

| Number | Country | Date |
| --- | --- | --- |
| 505,384 | Great Britain | May 10, 1939 |